United States Patent [19]

Cielo et al.

[11] 4,164,745

[45] Aug. 14, 1979

[54] PRINTING BY MODULATION OF INK VISCOSITY

[75] Inventors: Paolo Cielo; William D. Westwood, both of Ottawa, Canada

[73] Assignee: Northern Telecom Limited, Montreal, Canada

[21] Appl. No.: 903,503

[22] Filed: May 8, 1978

[51] Int. Cl.² ............................................. G01D 15/16
[52] U.S. Cl. ...................................... 346/140 R; 346/1
[58] Field of Search ............................... 346/1, 140 R

[56] References Cited

U.S. PATENT DOCUMENTS

| 3,308,475 | 3/1967 | Bean | 346/140 R |
| 3,480,962 | 11/1969 | Weigl et al. | 346/1 |
| 3,553,708 | 1/1971 | Carreira et al. | 346/140 R X |
| 3,790,703 | 2/1974 | Carley | 346/140 R X |

*Primary Examiner*—George H. Miller, Jr.
*Attorney, Agent, or Firm*—Sidney T. Jelly

[57] ABSTRACT

In a liquid ink printing system, ink is supplied to a reservoir at a constant pressure, and viscosity of ink in orifices in the reservoir wall is decreased by electrically heating the ink in the orifices. By this means the amount of ink deposited on a paper sheet moving past the orifices can be varied.

8 Claims, 7 Drawing Figures

PRINTING BY MODULATION OF INK VISCOSITY

This invention relates to printing by modulation of ink viscosity, and in particular is concerned with the variation in flow rate of ink through an orifice by modulation of the viscosity.

Various techniques exist for facsimile and other printing, such as impact, thermal and ink ejection.

Impact techniques require the mechanical displacement of a hammer which transfers ink from a ribbon to the paper to record the desired information. The main problems of these techniques are limited life and reliability of moving parts, noise, low speed, high power consumption and cost. With the present invention, there are no moving parts for the printing head and high speed, low noise and improved power consumption are obtained.

Thermal printing consists in localized heating of a pre-coated heat sensitive paper. Heat is usually supplied by an electric current through thin or thick-film resistors in contact with paper. With the present invention there is no need for precoated paper. Moreover, inks of different colours can be handled.

Ink jet printing comprises the ejection from an ink reservoir and subsequent deflection of ink droplets. The undeflected drops strike a paper sheet and form the desired pattern. Most droplets are however deflected to a gutter from which ink is returned to the reservoir through a recirculating and filtering system. This technique is bulky and complex owing to the hydraulic recirculating system, and hardly reliable because of the presence of high pressure ink containers and ink fog generated at the impact of ink with paper. With the present invention there is no continuous ink-jet, so that the recirculation system is not required and there is no high pressure impact of ink with paper. The system is more compact, and the projection of ink fog is avoided.

Broadly, the invention provides for the variation in viscosity of the ink by heating. The ink continuously flows but the amount of ink flowing from an orifice into contact with the paper will vary with the ink viscosity. In one example the amount is varied from a minimum to a maximum so that a line will be printed at all times, the width of the line varying with the viscosity: the lower the viscosity the wider the line. In an alternative arrangement a bye-pass is provided through which all the ink flows at high viscosities, the ink only flowing through the orifice as the viscosity decreases. Again the amount flowing through the orifice will increase as the viscosity decreases, printing a wider line.

The invention will be readily understood by the following description in conjunction with the accompanying drawings, in which.

Figure 1:
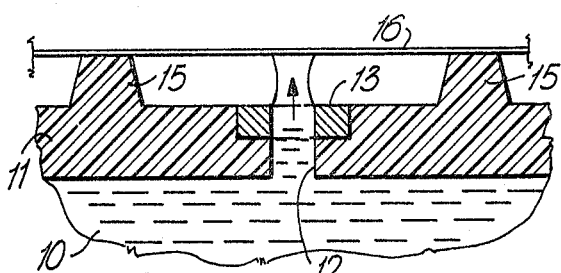
FIG. 1 is a cross-section through part of a printing head, illustrating one general form of the invention.

As illustrated in FIG. 1, ink, indicated at 10, is contained in a reservoir, the wall of which is indicated at 11. In the wall 11 is an orifice 12 and around the orifice is a resistor heating element 13. In practice a plurality of orifices are provided, as in FIG. 2. Spacers 15 position the paper 16 relative to the surface of the wall 11. The orifices can be of varying shapes, for example circular or rectangular. The ink 10 is under a constant hydrostatic pressure.

Figure 2:
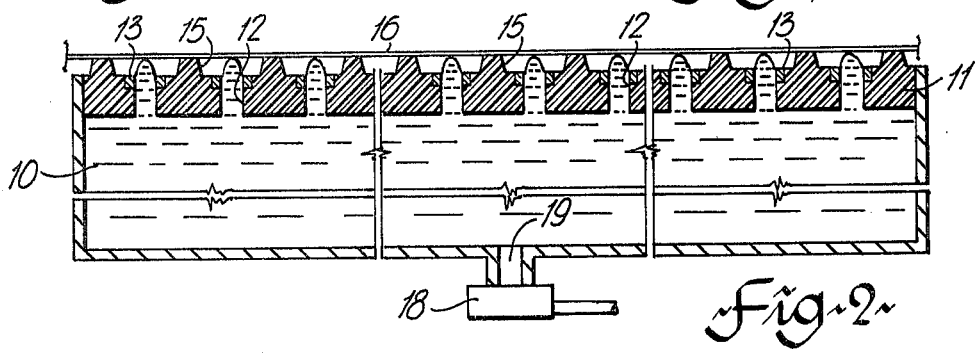
FIG. 2 is a transverse cross-section through one form of printing head.

Ink flows continuously through the orifice 12 to the paper under the effect of the hydrostatic pressure, the amount of ink depending upon its viscosity. If the paper is moved in one direction while ink is ejected, a continuous line will be printed on the paper. A series of parallel lines can be printed if there is a linear array of such slots, as illustrated in FIG. 2. By varying the ink viscosity, so is varied the ink flux through each slot and thus the line width along each line. In this manner, alphanumerics or greytone patterns can be printed by line-width modulation. Electrical connections to the resistor heating elements can readily be provided by conductors, deposited or otherwise formed, on the outer surface of the wall 11. Ink is supplied to the reservoir via a pump 18 and inlet 19.

More precisely, the ink flux through a cylindrical orifice is given by the following formula:

$$v = \frac{\pi}{8} \frac{pr^4}{\lambda \eta}$$

where

V is the volume transported per unit time:
p is the pressure;
$\eta$ is the viscosity coefficient;
$\lambda$ is the length of the orifice;
r is the radius of the orifice.

The value of $\eta$ decreases when the ink is heated thus increasing the ink flow and widening the printed line. Some liquids, such as castor oil and glycerol, show a decrease in the value of $\eta$ by a factor as large as 50 when heated from ambient temperature to 100° C. Therefore, the width of the continuous line, and consequently the reflectivity of printed paper, can vary significantly when heat is applied, making it possible to print alphanumerics or continuous tone images by line-width modulation, obtained by variation of the current supplied to the resistor heating element 13. The hydrostatic pressure is dropped when the machine is not printing. As a typical example, a castor oil-based or glycerol-based ink, with a $p \sim 0.1$ atm; $\lambda \sim 200$ $\mu$m and $r \sim 50$ $\mu$m, can provide a maximum ink flux high enough to print about 500 spots/sec. However various combinations of parameter values can be selected and if a less viscous ink is chosen, the value of r should be reduced or the pressure p decreased.

Figure 3:
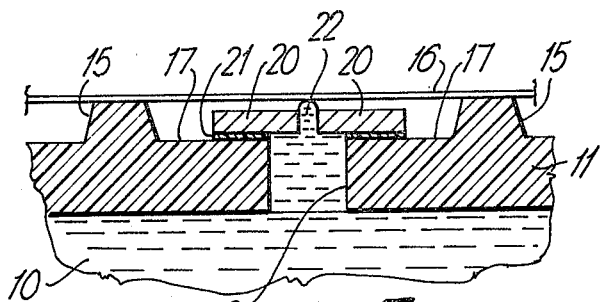
FIGS. 3 and 4 are cross-sections similar to that of FIG. 1, illustrating alternative forms.

FIGS. 3, 4, 5 and 6 illustrate modifications of the basic arrangement or form of FIGS. 1 and 2. In FIG. 3, a thick film resistor 20 is positioned on the surface 17 of the reservoir wall 11. Electric current can be supplied to the resistor by, for example, thin film conductors 21 previously formed or deposited on the surface 17. A small orifice 22 is drilled through the resistor, for example by a laser, the orifice 22 aligned with the orifice 12 in the wall 11, ink flowing through the orifice 22. The ink flow is primarily controlled by the orifice 22 because of its smaller size relative to orifice 12, and heating efficiency is good.

Figure 5:
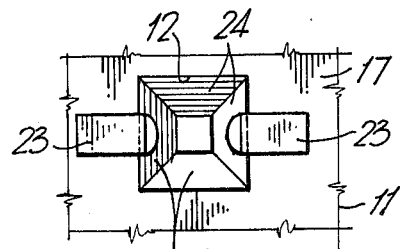
FIG. 5 is a bottom plan view in the direction of arrow X in FIG. 4.
Figure 4:
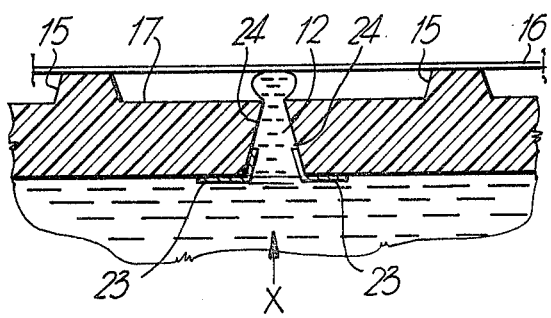

In FIGS. 4 and 5, the orifice 12 is pyramidal in form, which can be obtained by preferentially etching a (100) oriented silicon wafer along its (111), (11$\bar{1}$) etc. planes. Conductors 23 can be formed on the inner surface of the wall 11. The walls 24 of the orifice 12 can be doped to decrease the driving voltage and concentrate the electric current near the surface in contact with the ink.

Figure 6:
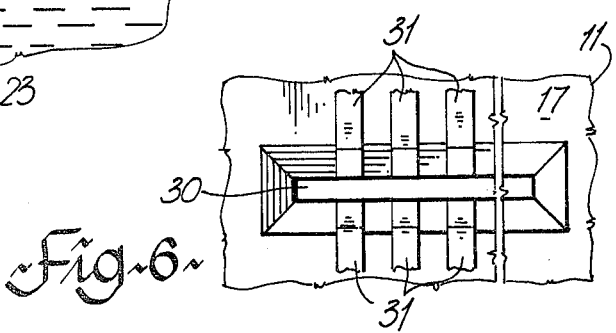
FIG. 6 is a bottom plan view of an alternative arrangement for the form of the invention illustrated in FIG. 4.

In FIG. 6, instead of a series of orifices as in FIGS. 4 and 5, which will produce dots with a space between, a tapered slot 30 is formed in the wall 11 and electrodes 31 are formed on the inner surface of the wall 11 and down into the slot. The electric current flows laterally, that is parallel to the slot 30, between two adjacent electrodes on both sides of the slot. This can reduce or even prevent spaces in the printed line, if desired, and is also easier to manufacture.

Figure 7:
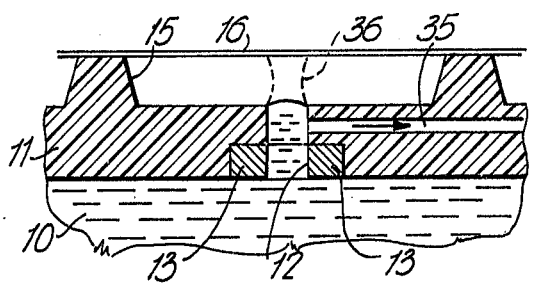
FIG. 7 is a further cross-section, similar to that of FIG. 1, illustrating another alternative form of the invention.

FIG. 7 illustrates a form of the invention in which the ink flow is bye-passed to prevent any ink flowing out of the orifice when the viscosity is above a predetermined value. In FIG. 7, the resistor heating element 13 is at the inner end of the orifice 12. Partway along the orifice 12 is a bye-pass duct 35. Ink flows up through the lower part of the orifice but is withdrawn through the bye-pass duct 35 at high viscosities. A suction is applied to the duct 35 and the ink can be returned to the reservoir. As the viscosity of the ink is decreased, by heating via the heating element 13, the flow rate of the ink will increase and some ink will flow through the upper part of the orifice 12 and issue into contact with the paper, as indicated by dotted lines 36.

What is claimed is:

1. Apparatus for printing by modulation of the viscosity of liquid ink, comprising:
    a reservoir for holding a supply of liquid ink of a predetermined viscosity, said reservoir including a wall and at least one orifice of a predetermined size in said wall;
    means for supplying ink to said reservoir at a predetermined pressure;
    electrical heating means associated with said orifice, said electrical heating means being controllably variable; and
    a bye-pass passage intercepting said orifice and connected to said reservoir;
    whereby when no heating is applied said ink flows through said bye-pass, application of heat reducing the viscosity of the ink and increasing the ink flow above the capacity of said bye-pass and ink issuing from said orifice.

2. Apparatus as claimed in claim 1, including a plurality of orifices arranged in a predetermined pattern.

3. Apparatus as claimed in claim 1, including a plurality of orifices extending in a line in said wall of said reservoir, and means for supporting a paper sheet for movement in a direction normal to said line and in a predetermined positional relationship to said wall.

4. Apparatus as claimed in claim 1, said orifice having a square cross-section.

5. Apparatus as claimed in claim 1, said orifice of elongate form, extending in a direction normal to a direction of movement of a paper sheet thereover, and a plurality of pairs of opposed electrodes spaced along said orifice.

6. Apparatus as claimed in claim 2, 3 or 1, said electrical heating means comprising a thick film resistor on a surface of an orifice.

7. A method of printing by undulating the viscosity of a liquid ink, comprising:
    feeding liquid ink having a predetermined viscosity to a reservoir at a predetermined pressure, said reservoir having at least one orifice in a wall thereof, said ink flowing to said orifice at a predetermined rate;
    electrically heating said ink at a controllably variable rate to vary the viscosity of the ink to thereby increase the flow of ink through said orifice;
    bye-passing ink from said orifice, all of the flow through said orifice bye-passed at one heating level, increased heating of said ink causing ink to flow from said orifice;
    feeding a paper sheet over said orifice for deposition of ink thereon.

8. A method as claimed in claim 7, said reservoir including a plurality of orifices in a predetermined pattern, and selectively controlling the heating of said ink in said orifice to selectively vary the flow of ink therethrough.

* * * * *